(12) United States Patent
Saxon et al.

(10) Patent No.: US 7,447,161 B2
(45) Date of Patent: Nov. 4, 2008

(54) SYSTEM AND METHOD FOR ENHANCED SONET NETWORK ANALYSIS

(75) Inventors: Robert W. Saxon, Birmingham, AL (US); Ray A. Dimit, Birmingham, AL (US)

(73) Assignee: ATCT Intellectual Property I, L.P, Reno, NV (US)

( * ) Notice: Subject to any disclaimer, the term of this patent is extended or adjusted under 35 U.S.C. 154(b) by 1027 days.

(21) Appl. No.: 10/322,253

(22) Filed: Dec. 18, 2002

(65) Prior Publication Data

US 2004/0120270 A1    Jun. 24, 2004

(51) Int. Cl.
  *H04J 1/16*    (2006.01)
(52) U.S. Cl. .............. 370/248; 370/258; 370/907; 709/224; 715/734; 715/738; 715/854
(58) Field of Classification Search .......... 370/258, 370/243, 403
  See application file for complete search history.

(56) References Cited

U.S. PATENT DOCUMENTS

| | | | |
|---|---|---|---|
| 5,774,669 A * | 6/1998 | George et al. ............... | 709/224 |
| 5,852,630 A * | 12/1998 | Langberg et al. ............ | 375/219 |
| 5,874,964 A * | 2/1999 | Gille .......................... | 715/853 |
| 6,098,028 A * | 8/2000 | Zwan et al. .................. | 702/120 |
| 6,370,154 B1 * | 4/2002 | Wickham .................... | 370/463 |
| 6,396,810 B1 * | 5/2002 | Hebel ......................... | 370/248 |
| 6,549,940 B1 * | 4/2003 | Allen et al. .................. | 709/219 |
| 6,628,304 B2 * | 9/2003 | Mitchell et al. ............. | 715/734 |
| 6,853,388 B2 * | 2/2005 | Ueno et al. .................. | 715/736 |
| 6,981,228 B1 * | 12/2005 | Chen et al. .................. | 715/853 |
| 7,054,334 B2 * | 5/2006 | Nakagawa et al. .......... | 370/471 |
| 7,075,536 B1 * | 7/2006 | Goldschmidt ............... | 345/440 |
| 7,085,279 B1 * | 8/2006 | Kumar et al. ................ | 370/401 |
| 7,113,934 B2 * | 9/2006 | Levesque et al. ............ | 707/1 |
| 7,143,152 B1 * | 11/2006 | Elman et al. ................ | 709/223 |
| 7,149,975 B1 * | 12/2006 | Johnson et al. ............. | 715/734 |
| 7,167,483 B1 * | 1/2007 | Sharma et al. .............. | 370/442 |
| 7,185,075 B1 * | 2/2007 | Mishra et al. ............... | 709/223 |
| 7,363,359 B1 * | 4/2008 | Tripathy et al. ............. | 709/223 |
| 2004/0081308 A1 * | 4/2004 | Naik et al. ............. | 379/221.07 |
| 2004/0098474 A1 * | 5/2004 | Galou et al. ................ | 709/223 |

* cited by examiner

*Primary Examiner*—Hassan Kizou
*Assistant Examiner*—Brian T O'Connor

(57) ABSTRACT

In an illustrative method for providing enhanced SONET network analysis, data related to the structure of a SONET network is identified, for example, in a database. The data comprises details regarding the network elements that form the SONET network as well as data regarding how the network elements are interconnected to form the SONET network. From the identified data, the nodes comprised in the SONET network are identified. Similarly, the plurality of communication links located between the identified nodes are retrieved from the data. Using the information identifying the nodes and plurality of communication links, a graphical representation of the SONET network is generated. In the graphical representation of the SONET network, nodes may be represented, for example, with a plurality of lines extending radially from a common point. Communication links between nodes are represented by lines that extend between the radial lines. An operator of a system upon which the graphical representation is displayed may select one or more of the lines in the graphical representation. Upon receipt of a selection input, data regarding the selected network element or communication link is identified in the data retrieved from the database and displayed.

18 Claims, 5 Drawing Sheets

```
Communication Channel Data
─────────────────────────────
I.D.:  123456AN/NodeA
Between:    NodeA
            Node B
STS #:      20
CAC:    CBA3LX6

[ OK ]
```

SYSTEM AND METHOD FOR ENHANCED SONET NETWORK ANALYSIS

FIELD OF THE INVENTION

The present invention relates generally to telecommunications systems, and more particularly, to systems and methods for analyzing networks.

BACKGROUND

Synchronous optical networks (SONETs) are an increasingly popular technology used in advanced telecommunication systems. Generally, SONET refers to a standard for optical telecommunications transport formulated by the Exchange Carriers Standards Association (ECSA) for the American National Standards Institute (ANSI). SONET networks typically comprise a plurality of network elements interconnected by fiber optic cables. Network elements may comprise link terminating elements, regenerators, add/drop multiplexers (ADM's), as well as other elements. SONET elements may be arranged in any of numerous different configurations such as point-to-point, point-to-multipoint, hub networks, and chain networks. One popular SONET network configuration is the ring architecture. In a SONET ring architecture, multiple network elements such as, for example, ADMs, are interconnected via fiber optics to form a continuous communication link capable of carrying bi-directional or unidirectional traffic between the network elements.

Telecommunication systems such as SONET networks are complex and comprise numerous network elements. Accordingly, element management systems (EMS's) have been generated for tracking the individual components that are comprised within the telecommunication networks. For example, a typical element management system may comprise a database of all of the elements in a particular network along with characteristic information regarding those elements. Although these systems are useful in tracking the provisioning of network elements, they lack in the capacity to allow for systems level analysis. For example, in the case of a SONET network, and in particular a SONET ring, it is useful to analyze the ring at a systems level so as to identify when portions of the ring are at or near capacity. In order to address this limitation, there has previously been developed systems and methods for enabling SONET network analysis. Specifically, systems and methods have been developed for creating graphical representations of SONET rings. A graphical representation of a SONET ring allows for the analysis of the entire ring, not simply portions of the ring. However, these systems too are lacking in their capacity to provide detailed information regarding various aspects of the SONET networks. For example, although a graphical representation of a SONET ring network is useful to create a general picture of the network, it does not communicate the detailed information regarding the components of the network that is necessary for proactively managing the SONET network.

SUMMARY

Applicants disclose herein systems and methods for enhanced SONET network analysis. Specifically, illustrative systems and methods are disclosed for providing detailed information regarding SONET networks in combination with graphical representations of the networks. According to a disclosed exemplary method, data related to the structure of a SONET ring network is identified, for example, in a database. The data may comprise details regarding the network elements that form the SONET ring as well as data regarding how the network elements are interconnected to form the SONET ring. The nodes comprised in the SONET ring are identified from the retrieved data. Similarly, the plurality of communication links located between the identified nodes are retrieved from the data. Using the information identifying the nodes and plurality of communication links, a graphical representation of the SONET ring is generated. In the graphical representation of the SONET ring, nodes may be represented, for example, with a plurality of lines extending radially from a common area or point. Communication links between nodes are represented by lines that extend between the radial lines. An operator of a system upon which the graphical representation is displayed may select one or more of the lines in the graphical representation. Upon receipt of a selection input, data regarding the selected network element or communication link is identified in the data retrieved from the database. For example, a unique identifier for a communication link selected by the user input may be retrieved from the data. Thereafter, the data regarding the communication link is displayed.

BRIEF DESCRIPTION OF THE DRAWINGS

Other features of the illustrative system and method will be further apparent from the following detailed description of an exemplary embodiment taken in conjunction with the accompanying drawings, of which.

DETAILED DESCRIPTION

Figure 1:
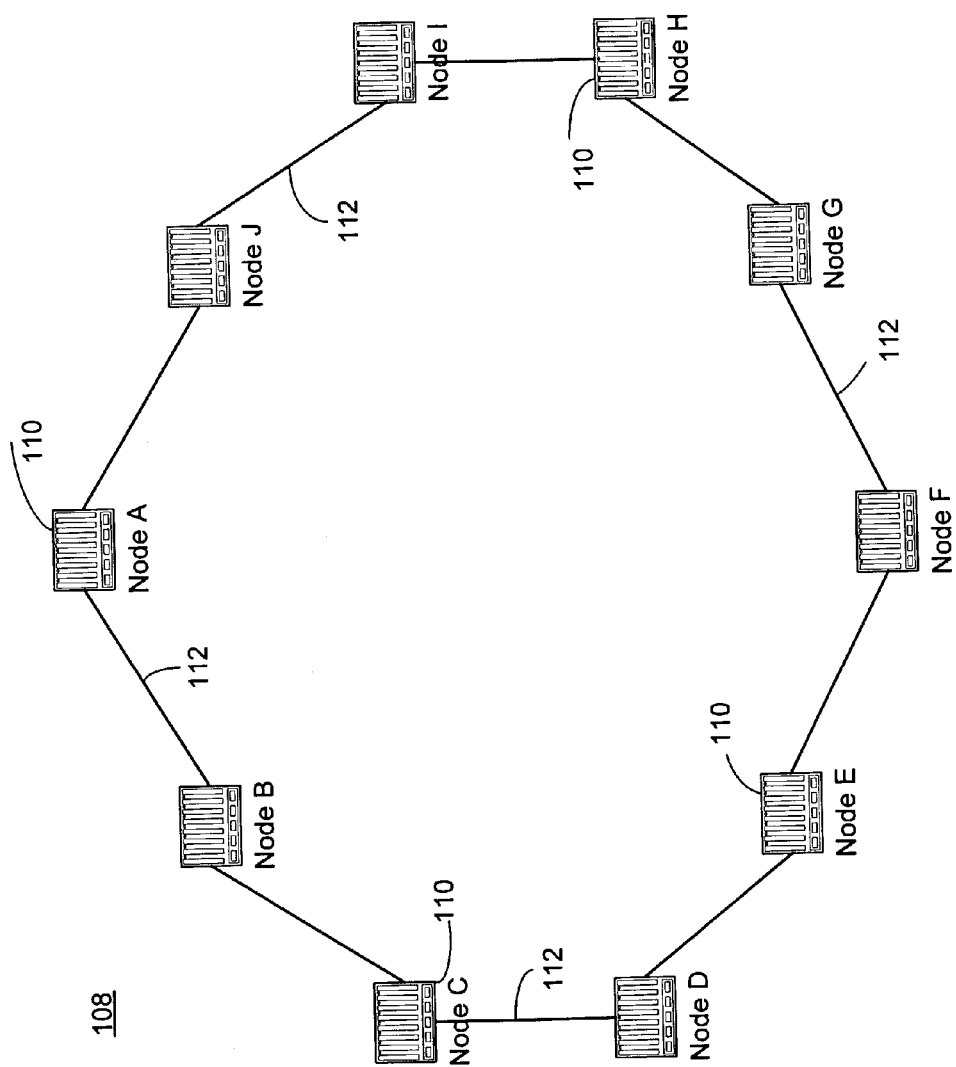
FIG. 1 is a diagram of an illustrative SONET ring network.

Applicants have developed novel systems and methods for enhanced SONET network analysis. FIG. 1 provides a diagram of an illustrative SONET ring network. As shown, the illustrative SONET ring 108 comprises nodes 110 and communication links 112. Nodes 110 generally correspond to network elements located at particular geographic locations and represent SONET ADM's, point-to-point terminals, or any other SONET interconnect device. For example, nodes 110 may be FT-2000 ADMs and DDM 2000 devices manufactured by Lucent Technologies or Fujitsu FLM2400, FLM600, and FLM150 devices. In the illustrative embodiment, nodes 110 may be located at different geographic locations. For example, in the instance where SONET ring 108 is employed as a long-haul data network between central offices (CO's) of a local telephone company, nodes 110 may be located at the CO's.

SONET ring 108 further comprises communication links 112 for the communication of data between nodes 110. In an illustrative embodiment, communication links 112 are fiber-optic trunks, with each trunk comprising a plurality of communication channels or circuits (not shown). Generally, SONET rings are designed to comprise a fixed number of channels such as, for example, 3, 12, or 24 channels per communication link. For example, each communication link 112 may have 24 communication channels therein with each channel operable to carry an independent stream of data. The degree to which the channels between any two nodes 110 are utilized may vary between nodes 110. For example, in the illustrative embodiment where each communication link 112 comprises 24 channels, any one channel may be used to carry data between two adjacent nodes 110. However, between the next adjacent node 110, the same channel may not be utilized at all. Thus, the degree to which various channels within a communication link 112 are employed can, and often does, vary within a SONET ring.

Element management systems (EMS) have been developed to track network elements such as nodes 110 and communication links 112 that exist in a SONET ring. EMS's are ideal for storing and managing information regarding individual network elements. However, an EMS does not easily provide information in a format that is useful in analyzing a system as a whole. For example, in the context of a SONET ring, it is helpful to understand which communication links 110 between nodes 110 are fully utilized or nearly fully utilized. This systems level information allows for spotting problems and planning.

Figure 2:
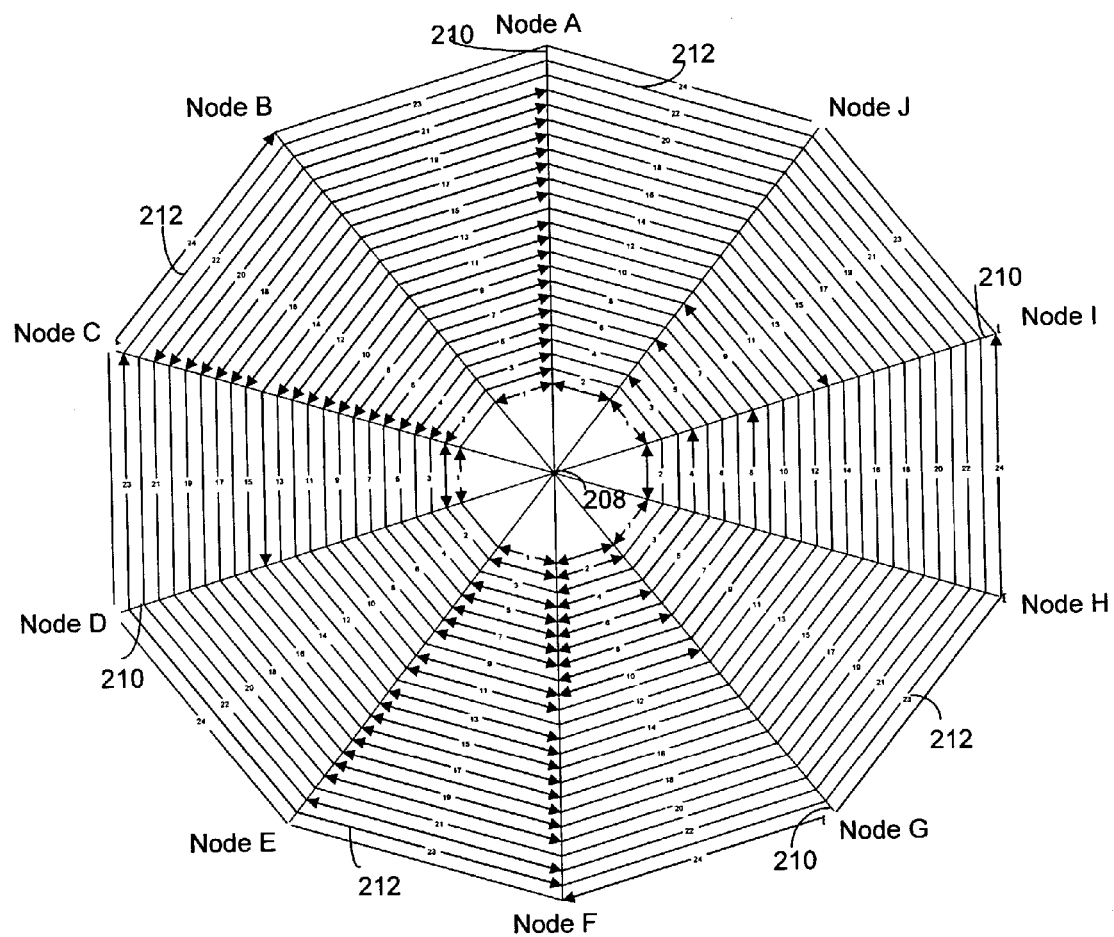
FIG. 2 is a diagram depicting nodes and communication links comprised in an illustrative SONET ring.

Applicants have previously developed systems and methods for presenting information in a format that is useful in analyzing SONET rings. Specifically, Applicants have previously developed systems for graphically depicting SONET rings. FIG. 2 provides a display of an illustrative graph corresponding to an illustrative SONET ring such as is described above in connection with FIG. 1. As shown in FIG. 2, a series of lines 210 extend radially from a central area or point 208. Each of these radial lines 210 represents a node 110 from FIG. 1. Extending between each radial line 210 are a series of lines 212, with each line 212 representing a communication channel, numbered 1 through 24, that exist in a communication link 112 between particular nodes 110. As lines 212 correspond to communication channels, they are referred to herein as communication channels lines.

Certain of the lines 212 representing communication channels are thicker than others, and still others lines 212 are shown in broken or dashed lines. Differences in the thickness and type of lines 212 correspond to characteristics of the corresponding communication channels. For example, lines 212 shown in relatively thin profile may represent unutilized or spare communication channels. Lines 212 that are shown in solid and relatively thick profile correspond to channels that are operable and in-service. Communication channel lines 212 that are shown in broken lines may represent communication channels that have been authorized for addition, rearrangement, or removal from service. Lines 212 that are shown in solid and thin parallel profile correspond to channels that are planned future additions. Lines 212 may have arrows at the ends thereof which point to node lines 210. Generally, an arrow indicates that data, which is communicated on the corresponding communication channel, drops off the SONET ring at the particular node 110, presumably to be processed outside of the SONET network or connected to another SONET ring. As indicated by the placement of the arrows, for many active communication channels, data is carried on the SONET ring only between adjacent nodes. However, other communication channels are employed to carry data across several nodes 110 before being dropped out of the SONET ring.

A diagram such as the exemplary graph of FIG. 2 provides a tool by which to analyze a SONET ring at a network level. For example, a diagram may assist in identifying locations in a SONET ring where the communication links are nearly fully utilized. Similarly, sections of a SONET ring that are under-utilized may be easily recognized. While a diagram such as that of FIG. 2 is a useful tool for network level analysis, it would be useful to have additional specificity regarding the various components that are depicted on the graph. For example, it would be useful to have access to the unique identifiers that are associated with any of the nodes 110 or communication channels that are represented by the various lines 210, 212 in the graph. Further, it would be advantageous to have an identifier of the data stream carried on a particular communication channel, where the data stream originates and terminates, both on the ring and it's ultimate destinations, and the current status of the data stream. For example, it is advantageous to have identified whether the data stream is in effect (IE), pending add (PA), pending remove (PR), pending disconnect (PD), etc. Moreover, it is advantageous to know information regarding any order associated with a node or communication channel. For example, it is useful to have access to the number of any order associated with a node or channel and the date the order activity took place.

Figure 3:
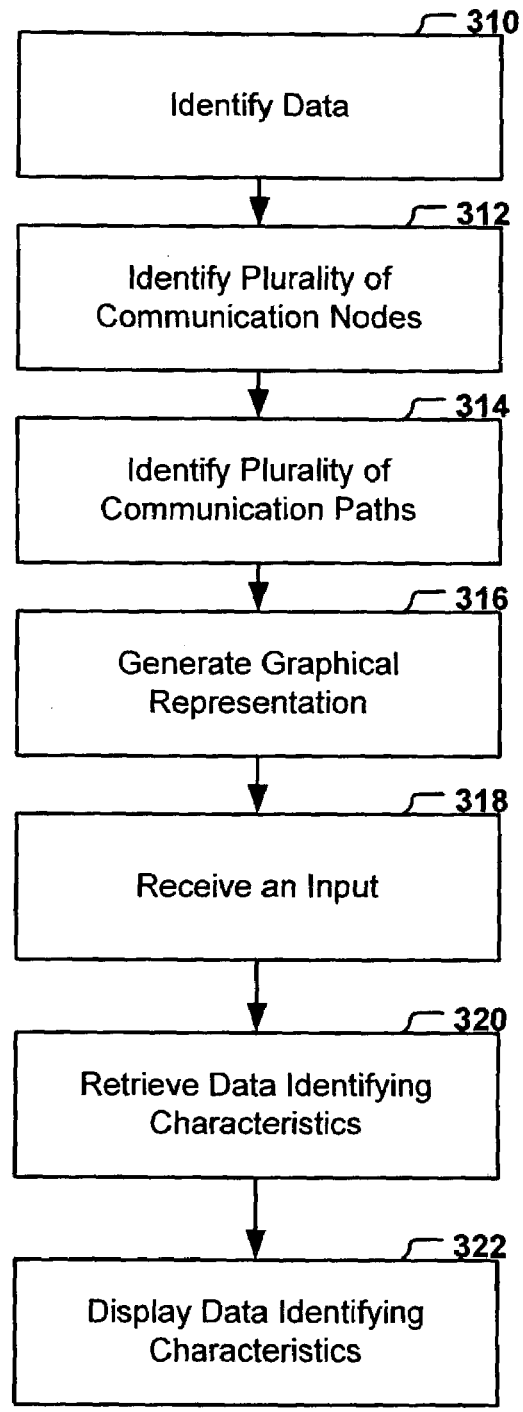
FIG. 3 is a flow chart of an illustrative method for presenting SONET ring data.
Figure 5:
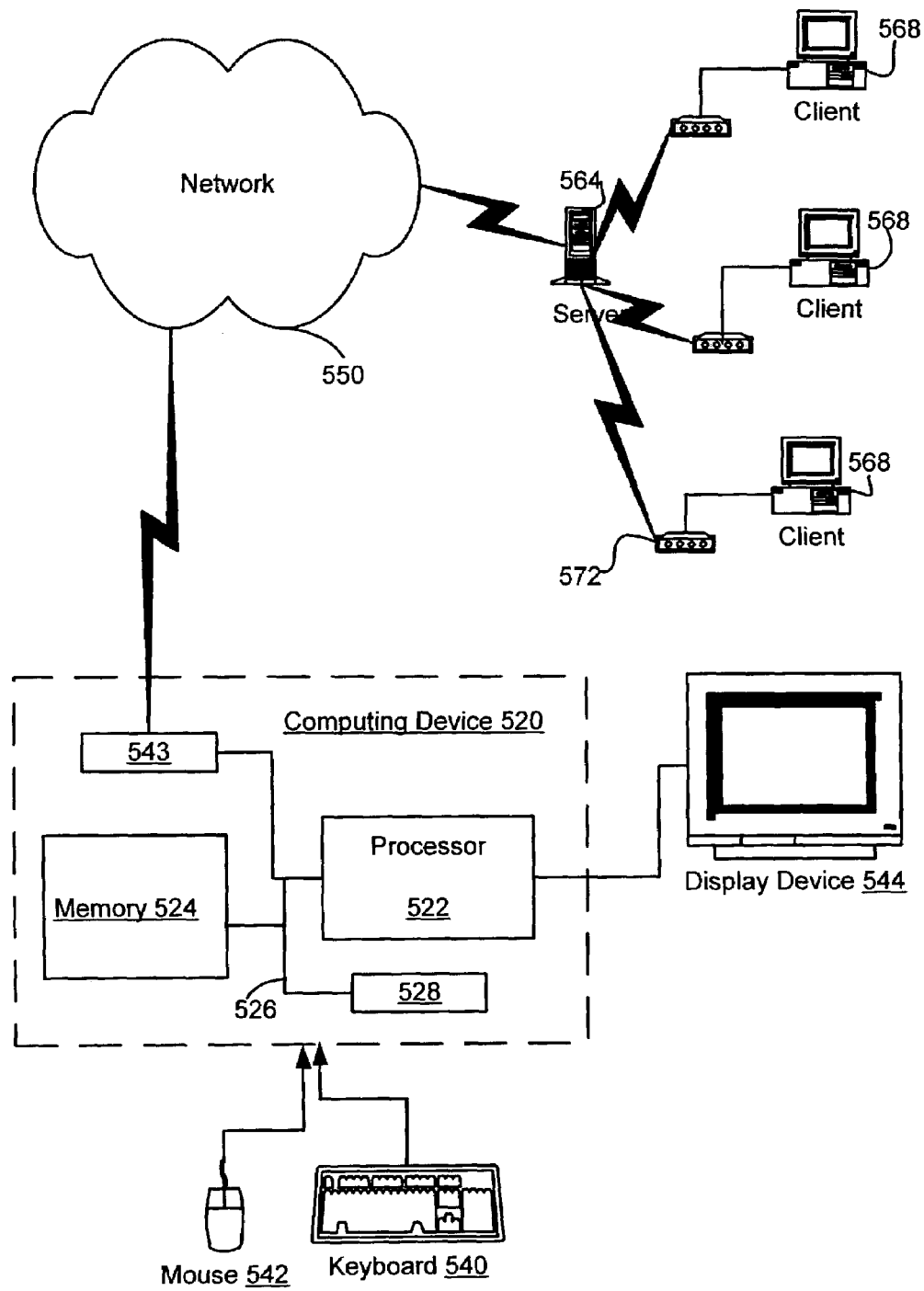
FIG. 5 is an illustrative diagram of a general purpose computing system suitable for use in presenting SONET ring data.

FIG. 3 provides a flow chart of an illustrative method for enhanced SONET ring analysis. More particularly, FIG. 3 provides a flow chart of a method for providing detailed information regarding SONET ring elements in combination with a graphical systems level view of the SONET ring. As shown, at step 310, a computing system such as, for example, that described below in connection with FIG. 5 is employed to identify and/or retrieve data related to a SONET ring. For example, a computing system may identify data related to SONET ring from a database located locally or across a network. The data may be that which is maintained in one or more EMS's. The identified data comprises data regarding nodes 110 and communication links 112 in the SONET ring. For example, the data regarding nodes 110 may comprise the following: the total number of nodes in the ring; a unique identifier for each node; the type of equipment at each node; the data rate at which the equipment operates; the location of each node; the number and type of the drop ports at each node; the identifier number of the element and the sequence number of the element indicating where it occurs in the ring; the physical location of the device in the central office or remote site; as well as other descriptive data. The data regarding communication links 112 that is retrieved may comprise the following for each communication channel in a link 112: a unique identifier; the working status of the communication channel (i.e. working, unutilized, deleted, etc.); the date of installation; an identification of the two nodes between which the channel operates; whether data on the channel drops out at a particular node; the maximum bandwidth capacity for the channel; an indication of the bandwidth capacity being utilized on each communication link; the circuit layout order (CLO) number which is the reference number of the authorization for the various network operations groups to perform activation, rearrangement, or disconnection of the data stream; the circuit access code (CAC) which is the alphanumeric character string that represents the data stream identification in a shorter format (e.g. a CAC code of CAZGE7 may be used in lieu of identification 304/T3Z/BRHMALMTK31/GDSDALMT); the sequence A number (SeqA#) which is the sequence number of the node where the data stream enters the ring; the synchronous transport signal number (STS#); and the sequence Z number (SeqZ#) which is the node where the data stream exits the ring.

At step 312, nodes 110 of the SONET ring are identified from the data collected at step 310. This may be accomplished, for example, via a scan or search for data related to a particular SCID.

At step 314, communication links 112 between nodes 110 are identified. In particular, identifying communication links 112 comprises identifying the plurality of communication channels that are likely to exist between nodes 110 in ring 108. For example, the following data items might be identified for each communication channel: a unique identifier which may be a channel number; the nodes between which the channel operates, i.e. the entry and exit node to the ring; the direction data travels on the ring from the entry and exit node; the status of the channel; any order number associated with the channel; and the CAC associated with the channel.

At step 316, the computing system generates a graphical representation of the SONET ring. For example, a diagram such as is described above in connection with FIG. 2 may be generated on a computer display. Generally, generating the graphical representation may comprise generating a plurality of lines 210 extending radially from a common area or point 208. Thereafter, channel lines 212, which are those representing communication channels between nodes, may be generated between the radial node lines 210. As previously mentioned, the profile and pattern of the channel lines 210 correspond to characteristics of the corresponding channels. For example, bold lines represent lines that are operational, while broken lines may indicate lines that have been removed from service. Lines shown in a thinner profile may represent communication channels that are not being used. Applicants have noted that additional characteristics of the communication channels may be communicated via color differentiation. For example, the color of a channel line may indicate the capacity that is being inefficiently utilized, e.g. channels that are inefficiently utilizing bandwidth, or drop ports may be shown in a color other than black, e.g. red, green, yellow etc.

At step 318, an input is received selecting one or more of lines 110 or 112. For example, at least one of the plurality of communication channel lines 212 may be selected. Lines 110 and 112 may be selected with a mouse click or other movement of the cursor.

At step 320, data regarding the node or communication channel corresponding to the selected line(s) is identified in the retrieved data. For example, in the case that a communication channel line 212 is selected, the following information may be identified: a unique identifier; an identification of a first node between which the channel communicates; the location of the first node; an identification of a second node between which the channel communicates; the location of the second node; a CAC code; an STS number; and the data rate of the communication channel. In the case that node line 210 is selected, the following information may be identified: a unique identifier for the node; the physical location of the node; the type of equipment comprised in the node; the data rate provided by the node; and any protection method that may be employed.

Figure 4:
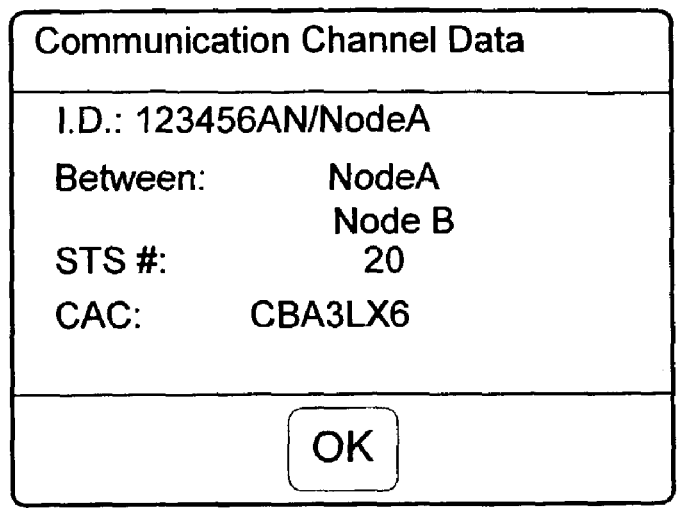
FIG. 4 is an illustrative screen display for presenting SONET ring data.

Finally, at step 322, the retrieved data is presented to the user. For example, the retrieved data may be displayed in a window or dialog box. An illustrative dialog box for presenting data is depicted in FIG. 4.

FIG. 5 is a diagram of a generic computing system in which the above-described illustrative method for providing enhanced SONET ring analysis may be implemented. As shown in FIG. 5, computing device 520 includes processor 522, system memory 524, and system bus 526 that couples various system components including system memory 524 to processor 522. System memory 524 may include read-only memory (ROM) and/or random access memory (RAM). Computing device 520 may further include hard-drive 528, which provides storage for computer readable instructions, data structures, program modules, data, and the like. A user (not shown) may enter commands and information into computing device 520 through input devices such as keyboard 540 or mouse 542. A display device 544, such as a monitor, a flat panel display, or the like is also connected to the computing device 520 or output. Display device 544 may also include other devices such as a touch screen, a light pen, a grid of light beams, or the like for inputting information into processor 522. Communications device 543, which may be a modem, network interface card, or the like, provides for communications over network 550.

Processor 522 can be programmed with instructions to interact with other computing systems so as to perform the methods described above. The instructions may be received from network 550 or stored in memory 524 and/or hard drive 528. Processor 522 may be loaded with any one of several computer operating systems such as WINDOWS NT operating system, WINDOWS 2000 operating system, LINUX operating system, and the like.

Computing device 520 may be communicatively coupled to computer network 550. Network 550 may be the Internet, a local area network, a wide area network, or the like. Server 564 is likewise operable to communicate with other computing devices over network 550. Server 564 may communicate e-mails, web pages, and other data such as SONET ring data. Server 564 may be operated by an ISP, a corporate computer department, or any other organization or person with a server connected to network 550. Server 564 is accessible by client stations 568 from which users may send and receive data.

Thus, illustrative systems and methods for providing enhanced SONET ring analysis have been disclosed. The systems and methods provide access to detailed information regarding SONET rings in the context of a systems level view of the SONET ring and thereby allow for thorough analysis of SONET rings.

Those skilled in the art understand that computer readable instructions for implementing the above-described processes, such as those described with reference to FIG. 3 can be generated and stored on one of a plurality of computer readable media such as a magnetic disk or CD-ROM. Further, a general purpose computer such as that described with reference to FIG. 5 may be arranged with other similarly equipped computers in a network, and may be loaded with computer readable instructions for performing the above described processes. Specifically, referring to FIG. 5, microprocessor 522 may be programmed to operate in accordance with the above-described processes.

While the disclosed systems and methods have been described and illustrated with reference to specific embodiments, those skilled in the art will recognize that modification and variations may be made. For example, while the disclosed embodiments relate to a SONET ring topology, alternative embodiments may relate to other types of SONET network topologies such as, for example, point-to-point, point-to-multipoint, and chain topologies. Furthermore, while the disclosed embodiments discuss providing detailed information regarding SONET communications channels, information may likewise be provided regarding SONET ring nodes or any other SONET component. Accordingly, reference should be made to the appended claims as indicating the scope of the invention.

What is claimed is:

1. A method for providing SONET ring data, comprising:
    identifying data related to a SONET ring;
    identifying from said data a plurality of nodes comprised in the SONET ring;
    identifying from said data a plurality of communication links located between said plurality of nodes in the SONET ring;

generating a graphical representation of the SONET ring, said graphical representation of the SONET ring representing the plurality of nodes and the plurality of communication links;

receiving an input that expressly selects at least one of the plurality of communication links without selecting one of the plurality of nodes;

retrieving data identifying characteristics of the selected at least one of the plurality of communication links, the data identifying characteristics including: a unique identifier, a first node between which the communication link communicates, a second node between which the communication link communicates, the location of the first node, the location of the second node, a circuit access code, an STS number and the data rate; and displaying said data identifying characteristics of the selected at least one of the plurality of communication links.

2. The method of claim 1, wherein identifying data related to a SONET ring comprises identifying data related to the following: nodes comprised in a SONET ring; network elements operating at the nodes; communication links between nodes comprised in the SONET ring.

3. The method of claim 2, wherein identifying data regarding a SONET ring further comprises identifying data related to the following: for each communication link, whether the communication link drops out at a node; the bandwidth capacity of each communication link; and an indication of the amount of bandwidth capacity being utilized on each communication link.

4. The method of claim 1, wherein identifying a plurality of communication links comprises identifying channels for carrying data between said plurality of nodes.

5. The method of claim 4, wherein identifying channels for carrying data between said plurality of nodes comprises identifying at least the following for each channel: a channel identifier; a first node between which the channel operates; a second node between which the channel operates; a circuit access code; and an indication of the location of the channel relative to other channels.

6. The method of claim 1, wherein generating a graphical representation of the SONET ring comprises:

generating a plurality of lines extending radially from a common point, each radial line representing one of said plurality of nodes; and generating a plurality of channel lines between each of adjacent radial line, each channel line representing a potential communication link between said plurality of nodes;

wherein said channel lines have characteristics to identify characteristics of the represented communication link.

7. The method of claim 6, wherein said channel lines have characteristics to identify whether the corresponding communication link is operable.

8. The method of claim 6, wherein said channel lines have characteristics to identify the capacity in use of the corresponding communication link.

9. The method of claim 6, wherein said channel lines have characteristics to identify the status of the corresponding communication link.

10. The method of claim 1, wherein receiving an input selecting at least one of the plurality of communication links comprises receiving a cursor input.

11. The method of claim 1, wherein receiving an input selecting at least one of the plurality of communication links comprises receiving an input selecting all of the communication links between two nodes.

12. The method of claim 9, wherein retrieving data identifying characteristics further comprises retrieving data identifying a level of a communication link relative to other communication links.

13. A computer readable medium having computer-implementable instructions that when executed by a computer, causes the computer to perform operations comprising:

identifying data related to a SONET ring;

identifying from said data a plurality of nodes comprised in the SONET ring;

identifying from said data a plurality of communication links located between said plurality of nodes in the SONET ring;

generating a graphical representation of the SONET ring, said graphical representation of the SONET ring representing the plurality of nodes and the plurality of communication links;

receiving an input that expressly selects at least one of the plurality of communication links without selecting one of the plurality of nodes;

retrieving data identifying characteristics of the selected at least one of the plurality of communication links, the data identifying characteristics comprising a unique identifier, a first node between which the communication link communicates, a second node between which the communication link communicates, the location of the first node, the location of the second node, a circuit access code, an STS number and the data rate; and displaying said data identifying characteristics of the selected at least one of the plurality of communication links.

14. A method for providing SONET network data, comprising:

generating a graphical representation of the SONET network, said graphical representation of the SONET network representing a plurality of nodes and a plurality of communication links between the nodes;

receiving an input that expressly selects at least one of the plurality of communication links without selecting one of the plurality of nodes;

retrieving data identifying characteristics of the selected at least one of the plurality of communication links, the data identifying characteristics including: the number of nodes in the ring, a unique identifier, the type of equipment at each node, the data rate at each node, the location of each node, the number and types of drop ports at each node, the physical location of each node, the working status of a communications channel, the date of installation, the identity of the nodes between which a channel operates, whether data on a channel drops out at a particular node, maximum bandwidth for a channel, bandwidth capacity being used on a communications link, the circuit layout order number, the circuit access code, the sequence A number, the STS number, and the sequence Z number; and displaying data identifying characteristics of the selected at least one of the plurality of nodes and the plurality of communication links.

15. The method of claim 14, further comprising:

identifying data related to a SONET network;

identifying from said data a plurality of nodes comprised in the SONET network; and identifying from said data a plurality of communication links located between said plurality of nodes in the SONET network.

16. The method of claim 14, wherein generating a graphical representation of the SONET network comprises:

generating a plurality of lines extending radially from a common point, each radial line representing one of said plurality of nodes; and generating a plurality of channel lines between each of adjacent radial line, each channel line representing a potential communication link between said plurality of nodes; wherein said channel lines have characteristics to identify characteristics of the represented communication link.

17. The method of claim 15, wherein identifying data related to a SONET network comprises identifying data related to the following: nodes comprised in a SONET network; network elements operating at the nodes; communication links between nodes comprised in the SONET network.

18. The method of claim 14, wherein identifying a plurality of communication links comprises identifying channels for carrying data between said plurality of nodes.

* * * * *